US006783883B1

(12) United States Patent
Koschany

(10) Patent No.: US 6,783,883 B1
(45) Date of Patent: Aug. 31, 2004

(54) GAS-PROOF ASSEMBLY COMPOSED OF A BIPOLAR PLATE AND A MEMBRANE-ELECTRODE UNIT OF POLYMER ELECTROLYTE MEMBRANE FUEL CELLS

(75) Inventor: Petra Koschany, Salzweg (DE)

(73) Assignee: Manhattan Scientifics, Inc., Los Alamos, NM (US)

( * ) Notice: Subject to any disclaimer, the term of this patent is extended or adjusted under 35 U.S.C. 154(b) by 0 days.

(21) Appl. No.: 09/720,657

(22) PCT Filed: Jun. 30, 1999

(86) PCT No.: PCT/DE99/01890

§ 371 (c)(1),
(2), (4) Date: Dec. 28, 2000

(87) PCT Pub. No.: WO00/02279

PCT Pub. Date: Jan. 13, 2000

(30) Foreign Application Priority Data

Jun. 30, 1998 (DE) .......................... 198 29 142

(51) Int. Cl.[7] ............................................. H01M 2/08
(52) U.S. Cl. .......................... 429/36; 429/32; 429/34; 429/35; 429/37; 429/38; 429/39; 429/18; 29/623.1; 29/623.2; 29/623.4; 29/623.5; 29/730
(58) Field of Search ....................... 429/32, 36, 12, 429/13, 30, 18, 34, 35, 37, 38, 39; 29/623.1, 623.5, 623.2, 623.4, 730

(56) References Cited

U.S. PATENT DOCUMENTS 5,264,299 A * 11/1993 Krasij et al. .................. 429/30
5,718,984 A * 2/1998 Iwase et al. ................... 429/49
5,759,712 A * 6/1998 Hockaday ...................... 429/26
5,841,021 A * 11/1998 De Castro et al. ........... 204/424
5,912,088 A * 6/1999 Ernst ............................ 429/35
5,928,807 A * 7/1999 Elias ............................. 429/35
5,989,741 A * 11/1999 Bloomfield et al. ......... 156/157
6,054,228 A * 4/2000 Cisar et al. .................... 429/18
6,080,503 A * 6/2000 Schmid et al. ................ 429/35
6,127,058 A * 10/2000 Pratt et al. ..................... 429/18
6,261,711 B1 * 7/2001 Matlock et al. ............... 429/12
6,284,401 B1 * 9/2001 Marchetti ...................... 429/35
6,303,245 B1 * 10/2001 Nelson ........................... 429/34

FOREIGN PATENT DOCUMENTS

JP      WO 01/29921    * 10/2000    ............ H01M/8/02

* cited by examiner

Primary Examiner—Bruce F. Bell
(74) Attorney, Agent, or Firm—James Creighton Wray; Meera P. Narasimhan

(57) ABSTRACT

According to known methods, gas chambers of fuel cells are sealed by applying pressure. A small space always remains between the electrode and the membrane. According to the inventive sealing method, the bipolar plate and the membrane-electrode unit are bonded with a curable polymer. A gas-proof assembly is obtained by applying an adhesive bead on the outer periphery of the gas chamber and around the inner gas ducts. These assemblies can be stacked and bonded together according to the present invention to form a stack of polymer electrolyte fuel cells. The inventive assemblies which are composed of a bipolar plate and a membrane-electrode unit can be used in polymer electrolyte fuel cells and in corresponding electrolytic cells. These assemblies have such a small weight that they can be used in mobile devices in a particularly advantageous manner.

15 Claims, 4 Drawing Sheets

GAS-PROOF ASSEMBLY COMPOSED OF A BIPOLAR PLATE AND A MEMBRANE-ELECTRODE UNIT OF POLYMER ELECTROLYTE MEMBRANE FUEL CELLS

BACKGROUND OF THE INVENTION

The invention relates to a gas-proof assembly composed of a bipolar plate and a membrane-electrode unit of polymer electrolyte membrane (PEM) fuel cells, a method for its production and the application of the assembly in a serial fuel cell stack.

A PEM fuel cell consists of two current collector plates, two porous, possibly catalyzed gas diffusion layers and a catalyzed or non-catalyzed ion exchange membrane which is arranged between these layers. No uniform technical terminology has been established yet with regard to the assembly components; occasionally the gas diffusion layers are described as electrodes, and occasionally the catalyst layers that are applied onto the membrane are also described as electrodes. The current collector plates are typically equipped with devices for feeding and distributing the reactants, so-called gas distribution structures. Since the electric voltage of a single cell is much too low for practical applications, a plurality of such cells have to be connected in series. In the resulting fuel cell pile or stack, the current derivation plates that coincide are termed bipolar plates. A bipolar plate, with one of its surfaces, is electrically connected to the anode of a cell of the stack, while the opposite surface is in contact with the cathode of the neighboring cell. The function of the bipolar plates is, on the one hand, to conduct the current through the stack, and on the other hand to separate the reaction gases. Furthermore, they are also usually equipped with gas distribution structures, such as a channel system, for better distribution of the reaction gases in the anode zone and the cathode zone.

By feeding the typical reaction gas hydrogen to the anode side of the fuel cell, cations are generated in the catalyst layer that is in direct contact with the ion exchange membrane at the anode side, and at the same time electrons are passed on to the anode side electron conducting layers. The oxidizing agent that is typically used is oxygen (or air), which is fed to the cathode side of the cell. The reaction gas oxygen is reduced by absorbing both the hydrogen ions that have diffused through the ion exchange membrane and the electrons that are fed from the anode to the cathode via an external circuit. This reaction also takes place in a catalyst layer that is in contact with the membrane on the cathode side. In preferred applications, the oxygen concentration in the air is sufficient. The reaction product is water. Reaction enthalpy is released in the forms of electric energy and of waste heat. The assembly of the membrane and the gas diffusion layers or electrodes, including the respective catalyst layers, is termed the membrane electrode assembly (MEA) in the following. As mentioned above, it has not yet been uniformly established in the literature whether the "electrodes" include portions of the gas diffusion layer or whether only the catalyst forms the electrodes. In the following, this will be pointed out should a differentiation be required for better understanding.

A considerable problem in the design of fuel cell stacks is the permanent seal of the anode zone. Due to the high avidity of hydrogen, this feature is required not only for achieving good utilization of energy, but also for safety reasons. If air or oxygen is used at excess pressure, the cathode zone must be sealed as well.

Many sealing systems require considerable pressure on the peripheral sealing edge in order to achieve the necessary sealing effect. This means that the clamping plates have to have larger dimensions and thus make the entire stack heavier, which is disadvantageous for mobile applications. The use of clamping elements at the frame generates additional weight due to metal parts with relatively thick walls. Mutual adjustment of the thicknesses of the electrodes and the bipolar plates and the thickness of the seal is extremely difficult because both the electrodes and the seal require suitable pressure, but have different degrees of elasticity. Tolerable thickness deviations are very small. This requirement leads to complex manufacturing procedures, which are very cost-intensive. The usage of different materials for the bipolar plates and the seals also causes the risk that leaks occur upon start-up because the different materials have different degrees of expansion when warming up. If elastomer seals are employed, thin membranes frequently rupture at the clamping step due to the change in length of the elastomer (e.g., silicone).

One method for sealing the gas chambers of PEM fuel cells consists of the production of seals with elastomer materials and the arrangement of these seals between the polymer electrolyte membrane and the bipolar plates, which are made of gas-proof graphite materials. To accomplish this, the seal is placed in slots that have been manufactured in a complicated process and that are provided for, exclusively for this purpose, in a carbon fiber paper which serves as a gas diffusion layer. Such an application can be found, for example, in U.S. Pat. No. 5,284,718.

The seal can also be formed by an elevation that is integrated in the bipolar plate and is formed by a stamping process. In this case, however, the bipolar plates will have to be made of an elastic, plastically deformable and gas-tight material, e.g. of graphite foils. Also, the seal requires, in this case, considerable pressure for achieving the sealing effect, which must be exercised by the clamping plates. Such a method is described e.g. in DE-OS 195 42 475 A1.

Another sealing method is presented in DE-PS 44 42 285 C1, where the negative polar plate, the membrane, the positive polar plate and two seals are clamped with each other at the periphery by a frame element in a gas-tight and electrically insulating manner. The frame element, which consists of metal, can be part of a polar plate and has a U cross-section. By expanding this U section element during assembly, the necessary pressing forces are generated.

It is also possible to manufacture a unit from a seal layer and the ion exchange membrane, as shown in EP-PS 0 690 519 A1. The seal layer, which consists of porous polytetrafluoroethylene, is applied to the membrane on both sides and surrounds the part of the membrane that is coated with the catalyst like a frame.

From JP 09-289029 we know of glued cells and also glued stacks, which are manufactured individually, stacked and then glued together to a stack. The figures of this publication show the glue-assembly with a square frame 18, shown in its top view in FIG. 4, i.e. a pre-formed glued insert. A comparable arrangement is also shown in WO 94/25995. It includes a frame element that is glued in by utilizing a silicon sealant. Due to manufacturing tolerances, but also due to their purpose, i.e. easy insertion, such pre-fabricated frames, however, do not completely fill the gap because the seal must be cut out larger than the gas diffusion layer, and the problem of the formation of a gap arises, especially on the outer side of the electrically conductive gas diffusion layer, between this layer and the gluing frame. In the area of this gap, the membrane rests neither against the seal nor against the gas diffusion layer and is therefore without support. Due to considerable expansion and shrinkage of the membrane in connection with environmental factors, especially humidity, these gaps are frequently the starting point for cracks in the membrane, which represent a destruction of the cell. There is especially increased risk for the formation of cracks in the membrane in case of heavily swelling membranes and very thin membranes, such as membranes made of sulfonated polyetherketone.

SUMMARY OF THE INVENTION

The invention is intended to prevent the formation of such a gap safely. This is accomplished by filling the volume zone, which surrounds the gas diffusion layer at the outside, all the way to its defining surfaces with an adhesive that has cured there, without gaps and in a gas-tight manner. In accordance with a preferred version, the adhesive even penetrates for a little length into the diffusion layer, and in accordance with another very important special version, such gap-free glued seals are incorporated not only on the outer circumference of the gas diffusion layer between the bipolar plate and the membrane, but also between these components where gas conducts are running through.

Additional preferred versions of the invention can be found in the respective sub-claims.

The invention is explained more in detail in the following, while referencing the drawings, by presenting an exemplary embodiment and intermediate stages of its manufacturing process. In the drawings show:

DETAILED DESCRIPTION

Figure 1:
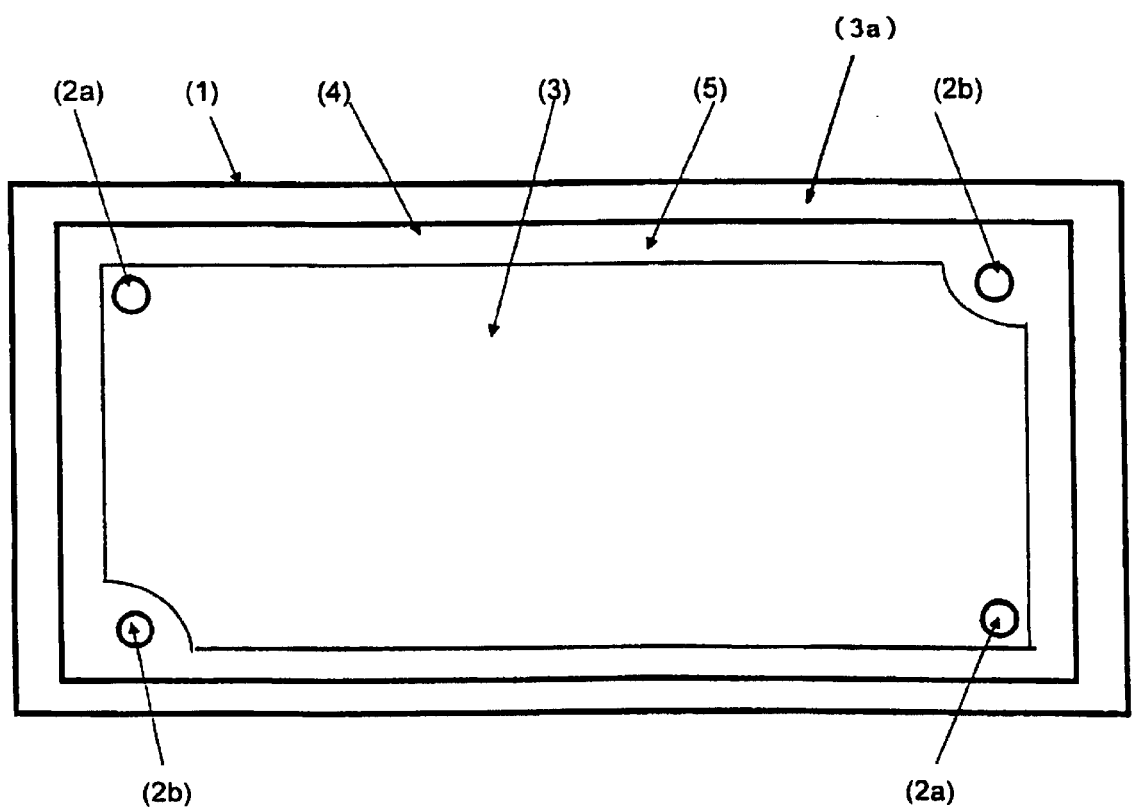
FIG. 1 a plan view of a bipolar plate with a gas diffusion layer, shown as if transparent, arranged on top of the bipolar plate.
Figure 4:
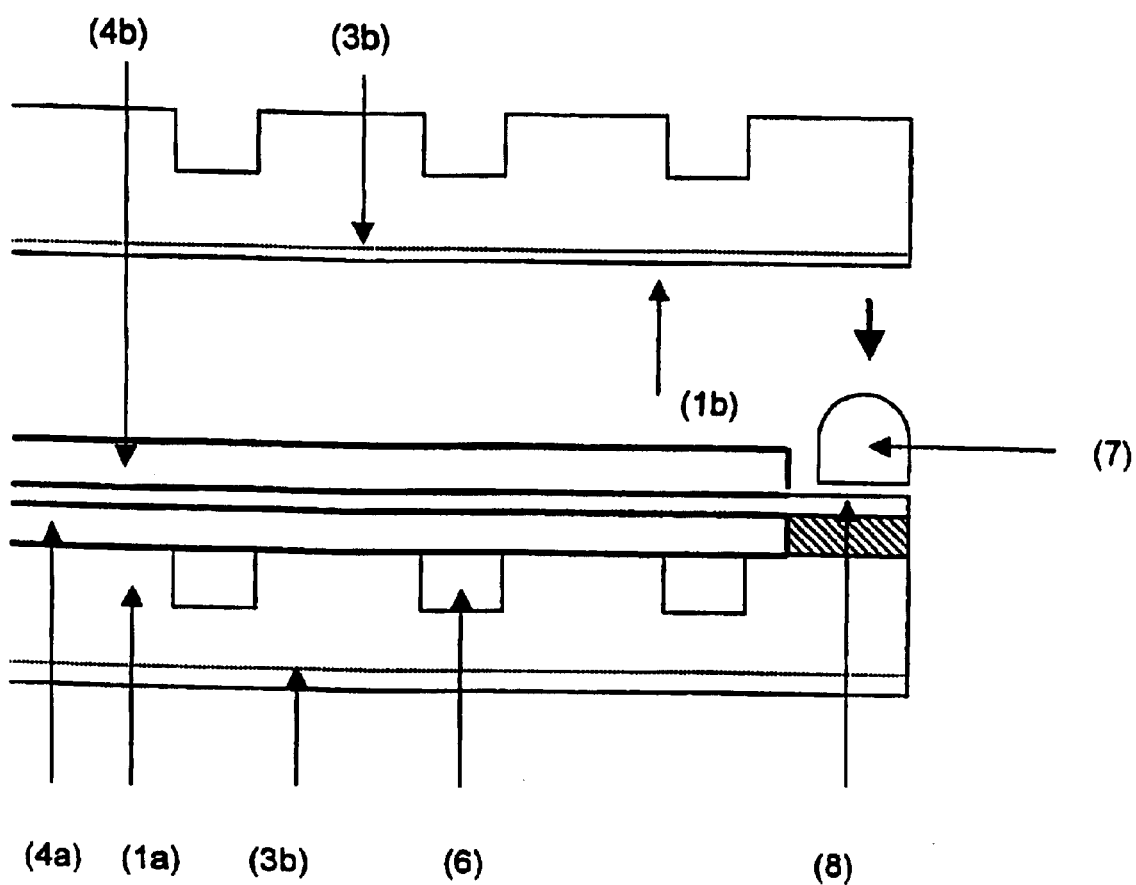
FIG. 4 a cross-sectional view through all the assembly layers of a cell stack in its marginal zone, with the upper half depicting an intermediate stage of the manufacturing process and the lower half depicting the final condition.

FIG. 1 shows a bipolar plate 1 with a side 1a and a side 1b and with gas conduct bores 2a for the reducing agent hydrogen and gas conduct bores 2b for the oxidizing agent oxygen or air, with a gas distribution structure, e.g. a channel structure 3, and with a circumferential, non-structured sealing edge, whose width is between 0.1 mm and 10 mm, preferably between 1 mm and 5 mm, particularly preferred between 2 mm and 3 mm. It is useful, but not necessary, that the elevations of the channel structure 3 are in the same plane as the sealing edge. Electrically conductive and gas-permeable gas diffusion layers 4 with a typical thickness between 0.1 mm and 0.5 mm are positioned on the bipolar plate and fastened by a fastening device, i.e. an anode side gas diffusion layer 4a of the hydrogen chamber and a cathode side gas diffusion layer 4b of the oxygen chamber (FIG. 4). In a particularly beneficial version, their positioning can be done with the help of pins in the gas conducts 2a and 2b. For this, the gas diffusion layers must be equipped with openings in those areas that correspond to the conducts in the bipolar plate. The gas diffusion layer 4a is slightly larger than the area of the bipolar plate which area is equipped with the channel structure 3. The overlapping area 5 between the gas diffusion layer 4 and the channel structure 3 is between 0.1 mm and 5 mm, preferably between 0.3 mm and 0.8 mm, and reduces the width of the sealing edge to a gluing edge 3a, which is that marginal area of the bipolar plate 1 which is situated outside the area overlapped by the gas diffusion layer and which defines an annular volume zone around the gas diffusion layer. The channel structure 3 with the gas diffusion layer 4a forms a hydrogen chamber 6.

At first, the sealing of the hydrogen chamber 6 will be explained, which is a preferred application. When manufacturing a gas-proof assembly composed of the bipolar plate and the membrane electrode unit, a distinction must be made as to whether a complete MEA is used in the design of the PEM fuel cell, i.e. one membrane with two catalyst layers and with at least the anode gas diffusion layer, or whether catalyzed membranes with applied anode gas diffusion layers are used. The following at first describes the method if having selected a catalyzed membrane with an only applied anode gas diffusion layer. The information provided regarding the width of the sealing edge, the thickness of the gas diffusion layer and the overlapping between the gas diffusion layer and bipolar plate applies preferably to all gluing methods that are still to be presented.

Figure 2:
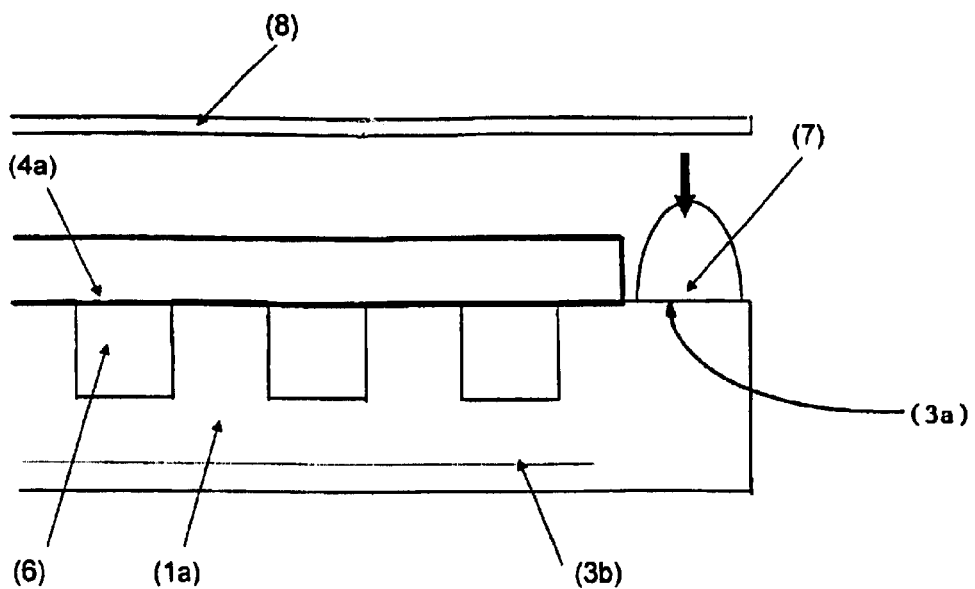
FIG. 2 a cross-sectional view through the anode side of an assembly according to the invention in its marginal zone in an intermediate stage of the manufacturing process.

After selecting a suitable adhesive for sealing the hydrogen chamber 6, as shown in FIG. 2, an adhesive bead 7, which is higher than the gas diffusion layer 4a of the hydrogen chamber, is applied to this side 1a of the bipolar plate, which is in contact with the anode side gas diffusion layer 4a, for the manufacture of the cell assembly. The volume of the adhesive that is applied is dimensioned in such a way that the gap between the side surface of the gas diffusion layer 4a and the subsequently cured adhesive is filled completely. The adhesive bead 7 is therefore applied with suitable metering devices in such a way that it protrudes over the surface of the gas diffusion layer 4a and is positioned on the gluing edge in such a way that it just barely touches the gas diffusion layer or ends just before it.

The assembly furthermore comprises a catalyzed or non-catalyzed membrane 8. By applying the e.g. catalyzed membrane 8, the adhesive bead 7 is now deformed in such a way that it fills the entire gap between the bipolar plate and the membrane bottom surface and that the adhesive reaches at least the fronts of the gas diffusion layer and preferably even penetrates <1 mm into the gas diffusion layer 4a. The membrane 8 applied this way can initially be plane on the gas diffusion layer 4a or also be slightly elevated in the area of the adhesive bead 7.

In order to place the thin, catalyzed membrane plane onto the bipolar plate with the gas diffusion layer and the adhesive bead, it is useful to employ an auxiliary device, specifically a moveable vacuum clamping table. Similar to a bipolar plate, it can be equipped with a channel system, which is covered by a porous carbon fiber paper. By generating negative pressure in this channel system, a membrane can be clamped flush and can be placed onto the bipolar plate having the gas diffusion layer and the adhesive bead, together with the vacuum clamping table. In a preferred version, the membrane and possibly the vacuum clamping table are equipped with bores in the same positions as is the bipolar plate, which bores later on are used as the gas conducts through the individual cells of a stack.

Subsequently, the adhesive must be cured at the appropriate conditions based on its composition, for example at slightly elevated temperatures or at room temperature.

Now it is possible to check the assembly composed of the bipolar plate and the membrane and obtained this way for leakage and also, if required, to perform functional testing of this individual fuel cell. The functional test can be performed by clamping the assembly together with a suitable air conduction structure made of graphite and operating the thus completed cell at least with air close to ambient pressure.

If a membrane to which the gas diffusion layers adhere is to be used, there is also a possibility available to seal the hydrogen chamber between the bipolar plate and the MEA. For this, the MEA must be equipped with a clear edge, i.e. not covered by the gas diffusion layer. The adhesive bead may then possibly not be applied onto the bipolar plate, but preferably directly onto the MEA, which in a beneficial version is clamped on a suitable vacuum clamping table. The MEA prepared this way can be placed onto the bipolar plate together with the vacuum clamping table.

Figure 3:
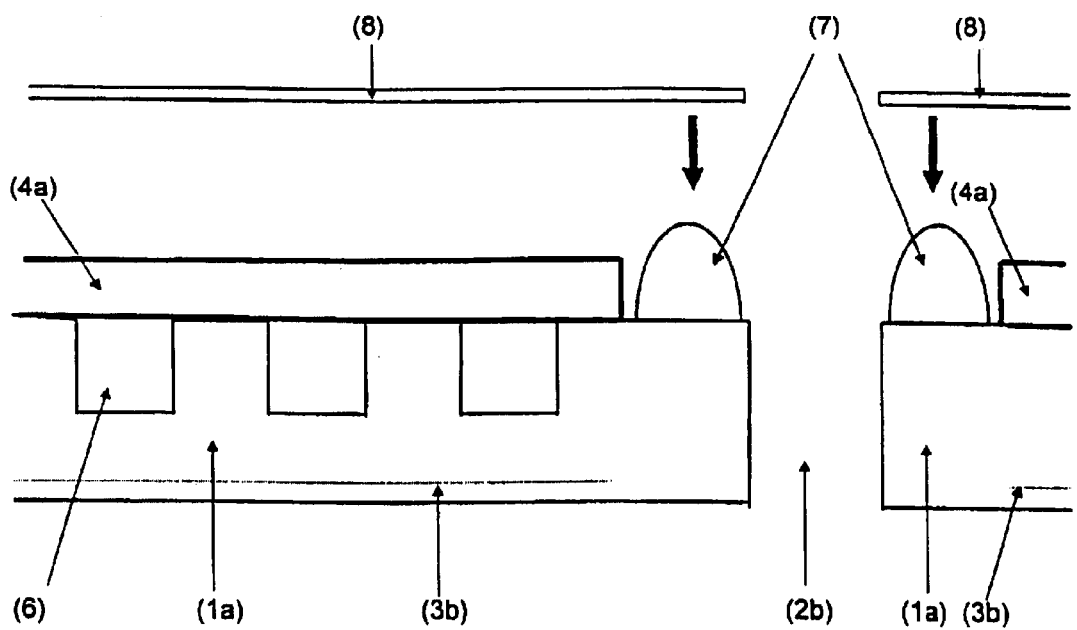
FIG. 3 a cross-sectional view corresponding to FIG. 2, in the zone of a gas conduct of the assembly.

As shown in FIG. 3, also the gas conducts such as the gas bore 2b for the oxidizing agent oxygen or air, passing through the part of the bipolar plate 1 whose side 1a is in contact with the anode, can be sealed against the hydrogen chamber 6 in the way that has already been described for the two kinds of MEA.

Figure 5:
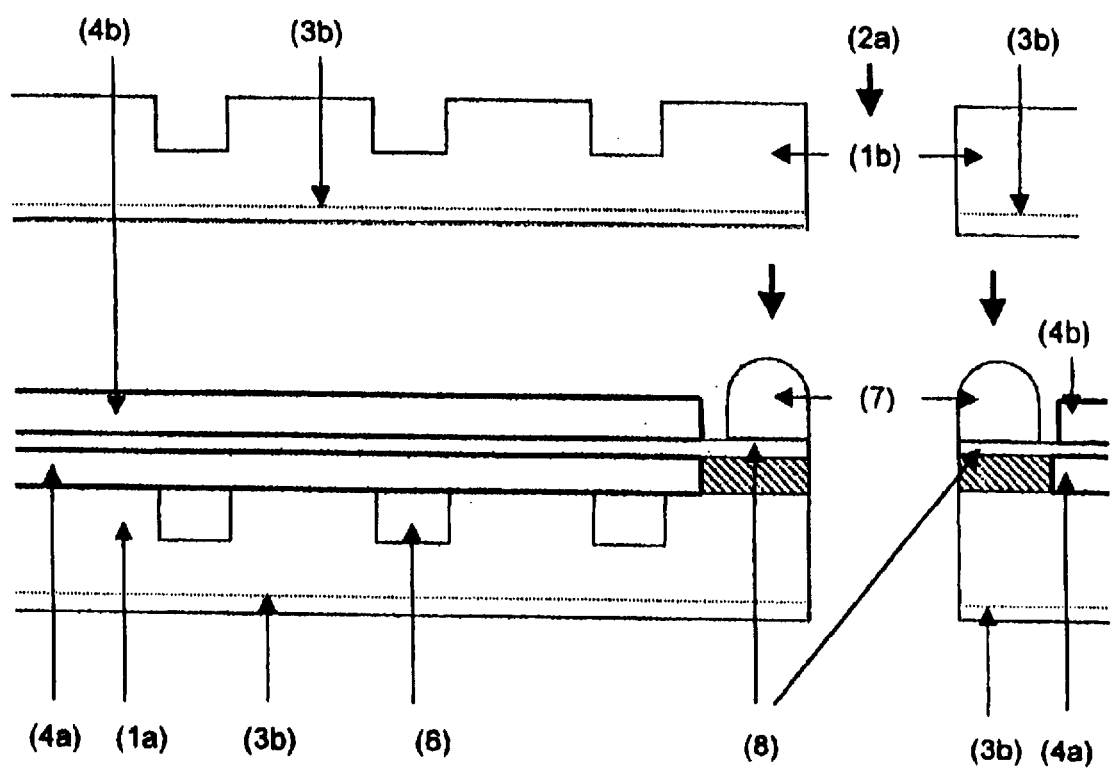
FIG. 5 a cross-sectional view corresponding to FIG. 4, in the zone of a gas conduct of the assembly.

In order to be able to produce a fuel cell stack from several assemblies of the invention composed of the bipolar plate and MEA, which stack can also be operated with oxygen or air at excess pressure, these assemblies can be glued together in an airtight and hydrogen-tight manner while following the above-described method (compare FIG. 4 and FIG. 5), in the following way:

Initially an assembly composed of the bipolar plate and the MEA, including the cathode side gas diffusion layer 4b, which leaves some area on the membrane at the periphery and around the hydrogen conduct for the adhesive bead, is prepared. The adhesive bead 7 is applied in the manner described above on the circumference of the membrane 8 (FIG. 4) and around the hydrogen conducts 2a (FIG. 5). Another assembly composed of a bipolar plate and an MEA is placed onto the adhesive bead 7 with the part of the bipolar plate 1 whose side 1b is in contact with the cathode. The adhesive is then cured under appropriate conditions. The adhesive bead 7 on the circumference of the membrane 8 seals the air, which can have excessive pressure, against the outer atmosphere, while the adhesive bead 7 around the hydrogen conduct 2a prevents that hydrogen can penetrate into the cathode area.

During operation with air close to ambient pressure, the seal depicted in FIG. 4 on the outer circumference of the air chamber can be dispensed with.

If through-holes for cooling media or clamping elements are provided, they can be sealed against the anode zone and cathode zone in the manner shown in FIG. 3 and also in FIG. 5.

The gas-proof assembly composed of the membrane electrode unit and the bipolar plate can thus be produced by a technically uncomplicated gluing process, employing one or several curable polymers (adhesives) as the gluing agent. In order to be able to manufacture a gas-tight assembly composed of a bipolar plate and a membrane in a simple manner, the adhesive must adhere to the bipolar plate and the membrane, which may be equipped with a catalyst. The effectiveness of noble metal catalysts and the conductivity of the membrane must not be impaired, neither during the curing process nor in the cured state, by volatile substances.

Commercial adhesives that meet these requirements are available. When utilizing metal bipolar plates, silicones are preferably suited as sealing adhesives. They adhere well to nearly all metals and to common perfluorinated and non-fluorinated membrane types that may or may not be equipped with a catalyst. When graphite bipolar plates or composites made of graphite and polymers are used, either epoxy resin of mean viscosity or again silicone can be employed as the adhesive sealant. In the latter, however, a bonding agent layer consisting of a thin epoxy resin coat must be applied to the preferably roughened bipolar plate surface. This epoxy resin coat can be applied through silk screen printing, spraying or brushing. If a particularly thin coat is desired, the two-component epoxy resin product Körapox 439 (Kömmerling GmbH) can e.g. be diluted prior to the process with low alcohols, such as ethanol.

The products Elastosil E 41 and E 43 (Wacker Chemie AG) are particularly suited for gluing all kinds of bipolar plates. Due to massive poisoning symptoms on the active centers of the catalyst and the membrane, the two-component epoxy resin Stykast W 19 (Grace N.V., Belgium) is not suited. The viscosity of the adhesive is between 10,000 mPas and 500,000 mPas, preferably between 60,000 mPas and 350,000 mPas. A slightly thixotrope consistency can be advantageous.

The benefits of the invented gluing method are that the gaps between the seal and the gas diffusion layers are avoided. Furthermore, no high pressure is required since it is replaced with the adhesion force of the gluing process. Neither the seal nor the electrodes must be manufactured at tight dimensional tolerances, and the cross-sections of the gas conducts can also be selected randomly. Leakage tests and at least functional tests with air at ambient pressure are possible for the individual cells. The glued seal generates nearly no additional weight. Therefore, cost-effective industrial production is possible.

REFERENCE LIST (1) Bipolar plate
(1a) Side of the bipolar plate that is in contact with the anode
(1b) Side of the bipolar plate that is in contact with the cathode
(2) Gas conducts
(2a) Gas conduct for the reducing agent hydrogen
(2b) Gas conduct for the oxidizing agent oxygen or air
(3) Gas distribution structure, e.g. channel structure
(3a) Gluing edge
(3b) Gas distribution structure for oxygen
(4) Gas diffusion layer
(4a) Gas diffusion layer of the hydrogen chamber
(4b) Gas diffusion layer of the oxygen chamber
(5) Overlap between the gas diffusion layer and the bipolar plate
(6) Hydrogen chamber
(7) Adhesive bead
(8) Membrane

What is claimed is:

1. Assembly composed of a membrane-electrode unit "MEA" (8, 4a, 4b) and a bipolar plate (1) of a fuel cell as component of a fuel cell stack, wherein the MEA comprises a polymer electrolyte membrane (8) and a gas diffusion layer (4a, 4b) resting in the assembly on the membrane with the exception of the membrane periphery, with the bipolar plate (1) resting against the side of the gas diffusion layer opposite the membrane and protruding over the periphery of the gas diffusion layer while forming a circumferential marginal volume zone that is defined at the top, inner and bottom sides by the bipolar plate (1), the gas diffusion layer (4a, 4b) and the membrane (8), characterized in that the circumferential volume zone is filled with a cured adhesive (7) all the way to its defining faces in a gap-free and gas-tight manner.

2. Assembly composed of a bipolar plate and an MEA in accordance with claim 1, characterized in that the hydrogen side of the bipolar plate (1) is glued together with the anode side of the MEA (8, 4a, 4b).

3. Assembly composed of a bipolar plate and an MEA in accordance with claim 1, characterized in that the adhesive (7) penetrates into the gas diffusion layer (4a) 0.2 mm to 1 mm.

4. Assembly composed of a bipolar plate and an MEA in accordance with claim 1, characterized in that the hardened adhesive (7) is a cured silicone or an epoxy resin.

5. Assembly composed of a bipolar plate and an MEA in accordance with claims 1, characterized in that the bipolar plate (1) and/or the membrane (8) has been pretreated with a bonding agent in the area of the adhesive.

6. Assembly composed of a bipolar plate and an MEA in accordance with claim 1, characterized in that a surface of the circumferential volume zone of the bipolar plate (1), which has been bonded with the cured adhesive (7), and a surface of its gas distribution structure (6) are located flush in one plane.

7. Assembly composed of a bipolar plate and an MEA in accordance with claim 1, characterized in that in an area of gas conducts, also such volume zones which are defined at the top, exterior and bottom sides by the bipolar plate (1), the gas diffusion layer (4a, 4b) and the membrane (8) and which surround the gas conducts (2a, 2b), are filled with a cured adhesive in a gap-free and gas-tight manner.

8. Method for producing a gas-tight assembly comprising providing at least one bipolar plate, providing a gas diffusion layer, providing at least one membrane electrode unit "MEA", providing a circumferential marginal volume zone that is defined at its top, inner and bottom sides by the bipolar plate (1), an edge of the gas diffusion layer (4a, 4b) and the membrane (8) initially applying in a sealing manner a free-flowing adhesive to a margin of the membrane or the bipolar plate in the form of an adhesive bead that is higher than the gas diffusion layer and whose volume is dimensioned so as to completely fill the circumferential marginal volume zone, and then bringing the adhesive into a shape of the volume zone by assembling the membrane, the gas diffusion layer and the bipolar plate and permitting the adhesive to cure.

9. Method in accordance with claim 8, characterized in that a hydrogen side of the bipolar plate or of the MEA is glued by applying the adhesive to the hydrogen side of the bipolar plate or of the MEA.

10. Method in accordance with claim 8, characterized in that the adhesive is allowed to penetrate into the gas diffusion layer by 0.2 mm to 1 mm before curing.

11. Method in accordance with claim 8, characterized in the gluing process is performed with a curable silicone or an epoxy resin.

12. Method in accordance with claim 8, characterized in that the bipolar plate and/or the membrane are pretreated with a bonding agent in the area of the adhesive.

13. Method for producing a gas-tight assembly, comprising providing at least one bipolar plate and at least one membrane electrode unit "MEA" with a membrane and a gas diffusion layer, providing a circumferential marginal volume zone that is defined at its top, inner and bottom sides by the membrane, the bipolar plate (1), an edge of the gas diffusion layer (4a, 4b), initially applying a free-flowing adhesive to a margin of the membrane or the bipolar plate in the form of an adhesive bead that is higher than the gas diffusion layer and whose volume is dimensioned so as to completely fill the circumferential marginal volume zone, and then bringing the adhesive into the shape of the volume zone by assembling the assembly composed of the membrane, the gas diffusion layer and the bipolar plate and permitting the adhesive to cure, further characterized in that a vacuum clamping table is utilized for positioning the MEA with or without gas diffusion layers on the bipolar plate.

14. Method for producing a gas-proof assembly according to claim 7 which assembly comprises gas conducts, characterized by the fact that at least one of the gas conducts (2a, 2b) conveying the gas, which is not to penetrate into the gas chamber of the assembly, is sealed by a gluing process with the adhesive as described for the marginal volume zone.

15. A method of assembling fuel cell stacks and/or piles of electrolysis cells wherein several assemblies comprised of a bipolar plate and an MEA in accordance with claim 1 are connected electrically in series by stacking.

* * * * *